(12) United States Patent
Velasco

(10) Patent No.: US 12,042,052 B1
(45) Date of Patent: Jul. 23, 2024

(54) SYSTEM FOR IMPROVING THE SUPPORT OF TENSIONED ELASTOMERIC SEATING SUSPENSIONS

(71) Applicant: Franklin Products, Inc., Torrington, CT (US)

(72) Inventor: Howard Velasco, Bristol, CT (US)

(73) Assignee: FRANKLIN PRODUCTS, INC., Torrington, CT (US)

(*) Notice: Subject to any disclaimer, the term of this patent is extended or adjusted under 35 U.S.C. 154(b) by 589 days.

(21) Appl. No.: 17/199,751

(22) Filed: Mar. 12, 2021

Related U.S. Application Data

(60) Provisional application No. 62/988,534, filed on Mar. 12, 2020.

(51) Int. Cl.
*A47C 27/06* (2006.01)
*A47C 27/07* (2006.01)

(52) U.S. Cl.
CPC .......... *A47C 27/067* (2013.01); *A47C 27/065* (2013.01); *A47C 27/07* (2013.01)

(58) Field of Classification Search
CPC ..... A47C 27/067; A47C 27/065; A47C 27/07; A47C 7/32
USPC .................................................... 297/452.56
See application file for complete search history.

(56) References Cited

U.S. PATENT DOCUMENTS

| | | | |
|---|---|---|---|
| 2,673,599 A | 3/1954 | Larsen | |
| 2,839,126 A | 6/1958 | O'Neill | |
| 3,420,278 A | 1/1969 | Heckethorn | |
| 3,476,169 A * | 11/1969 | Militano | A47C 5/06 297/DIG. 2 |
| 4,883,320 A * | 11/1989 | Izumida | B60N 2/7094 297/452.56 |
| 6,361,117 B1 * | 3/2002 | Tate | B60N 2/70 297/452.56 |
| 6,722,742 B2 * | 4/2004 | Potes | B60N 2/7011 297/452.56 |
| 6,983,997 B2 | 1/2006 | Wilkerson et al. | |
| 7,025,423 B2 * | 4/2006 | Fujita | B60N 2/7035 297/452.38 |

(Continued)

FOREIGN PATENT DOCUMENTS

| | | |
|---|---|---|
| CH | 278234 A | 10/1951 |
| GB | 680906 A | 10/1952 |

(Continued)

OTHER PUBLICATIONS

International Search Report for PCT Serial No. PCT/US2017/025368 dated Aug. 14, 2017.

(Continued)

*Primary Examiner* — Milton Nelson, Jr.
(74) *Attorney, Agent, or Firm* — McCormick, Paulding & Huber, PLLC

(57) ABSTRACT

A seat having a seat bottom assembly supporting a diaphragm between side members of a structural frame of the seat. The seat bottom assembly including a diaphragm having a first flank portion, a main portion and a second flank portion arranged between the side members, the main portion being between the flank portions. The diaphragm is supported such that the main portion of the diaphragm contains an effective length of stretchable material of the diaphragm when supporting an occupant of the seat.

20 Claims, 19 Drawing Sheets

(56) References Cited

U.S. PATENT DOCUMENTS

| | | | |
|---|---|---|---|
| 7,588,297 B1 * | 9/2009 | Picard | A47C 7/282 |
| | | | 297/452.56 |
| 8,480,171 B2 * | 7/2013 | Chadwick | A47C 1/03272 |
| | | | 297/301.5 |
| 10,342,352 B2 * | 7/2019 | Coffield | A47C 7/287 |
| 2001/0030457 A1 | 10/2001 | Gregory | |
| 2002/0135218 A1 * | 9/2002 | Fujita | B60N 2/70 |
| | | | 297/452.56 |
| 2004/0212234 A1 | 10/2004 | Fujita et al. | |
| 2012/0313414 A1 | 12/2012 | Donati | |

FOREIGN PATENT DOCUMENTS

| | | | |
|---|---|---|---|
| GB | 902277 A | | 8/1962 |
| GB | 2 420 705 A | | 6/2006 |
| KR | 2010011564 U | * | 11/2010 |
| WO | 2012/106828 A2 | | 8/2012 |

OTHER PUBLICATIONS

Written Opinion of the International Searching Authority for PCT Serial No. PCT/US2017/025368 dated Aug. 14, 2017.
International Search Report for International Application No. PCT/US2018/042991 dated Nov. 29, 2018.
Written Opinion for International Application No. PCT/US2018/042991 dated Nov. 29, 2018.
Extended European Search report for EP Application No. 17776772.0 dated Sep. 6, 2019.

* cited by examiner

SYSTEM FOR IMPROVING THE SUPPORT OF TENSIONED ELASTOMERIC SEATING SUSPENSIONS

CROSS-REFERENCE TO RELATED APPLICATION

This application claims the benefit of U.S. Provisional Patent Application No. 62/988,534 filed on Mar. 12, 2020, which is hereby incorporated by reference in its entirety.

TECHNICAL FIELD

The present disclosure generally relates to seats and seat bottom assemblies having an elastomeric seating surface that supports an occupant and, more particularly, relates to an elastomeric seating surface construction that becomes more supportive when depressed by the weight of an occupant.

BACKGROUND

The use of tensioned diaphragms for seating is well known. They can be found in many types of seats. For example, many office chairs now rely on fabric diaphragms to support the occupant without the use of cushions or other padding. Seats having diaphragms combined with cushioning have been used in transportation vehicles for years, particularly in commercial aircraft.

The modern diaphragm is typically made of elastomeric material or fabric containing elastomers that can be tensioned by stretching to form a strong yet flexible system that comfortably supports the occupant. Some applications, such as aircraft seats, require a high degree of support because of regulatory load requirements needed to meet safety standards and because of the limited space available for deflection of the diaphragm caused by a seated passenger.

In the past, the necessary high degree of support has been achieved by installing the diaphragm under high initial tension or by making the diaphragm of stronger, more tenacious material. Although these approaches have worked, they are not optimal. When more support is needed, simply increasing initial tension requires stronger seat frame structures and attachments which are heavier and more costly. Very high initial tensions can negatively impact comfort, and durability may be negatively affected by working the diaphragm material closer to the limit of its allowable stretch range. Using diaphragm fabrics made of materials that are inherently more supportive, such as those with more or larger elastomer strands, also leads to increased cost and weight. Therefore, an alternative way to improve support without overly increasing cost and weight is highly desirable.

SUMMARY

The present disclosure provides devices, systems and methods that redefine the length of stretchable diaphragm material as a way to increase tension in the diaphragm to improve support.

According to the present disclosure, a seat is formed having a conventional seat frame with an elastomeric fabric diaphragm of a seat bottom assembly being stretched laterally and attached to the seat frame to form a comfort surface for an occupant. Although not necessary for all applications, additional padding or cushioning of conventional design can be applied by known methods.

According to the present disclosure, a seat is formed having a tensioned elastomeric diaphragm suspension comfort surface. The comfort surface includes a central main portion and two flank portions adjacent along two opposing sides of the main portion. A seat bottom assembly may include inextensible tension-struts linking junctions of the main portion and adjacent flank portions to the seat frame. As the occupant's weight is applied to the seat, the tension-struts rotate about pivots in a way as to constrain the stretch of the flank portions that are attached to the frame and cause the main portion of the diaphragm to be further tensioned and become more supportive.

Objects, features and advantages of the present invention will become apparent in light of the description of embodiments and features thereof, as enhanced by the accompanying figures.

DETAILED DESCRIPTION

Figure 1:
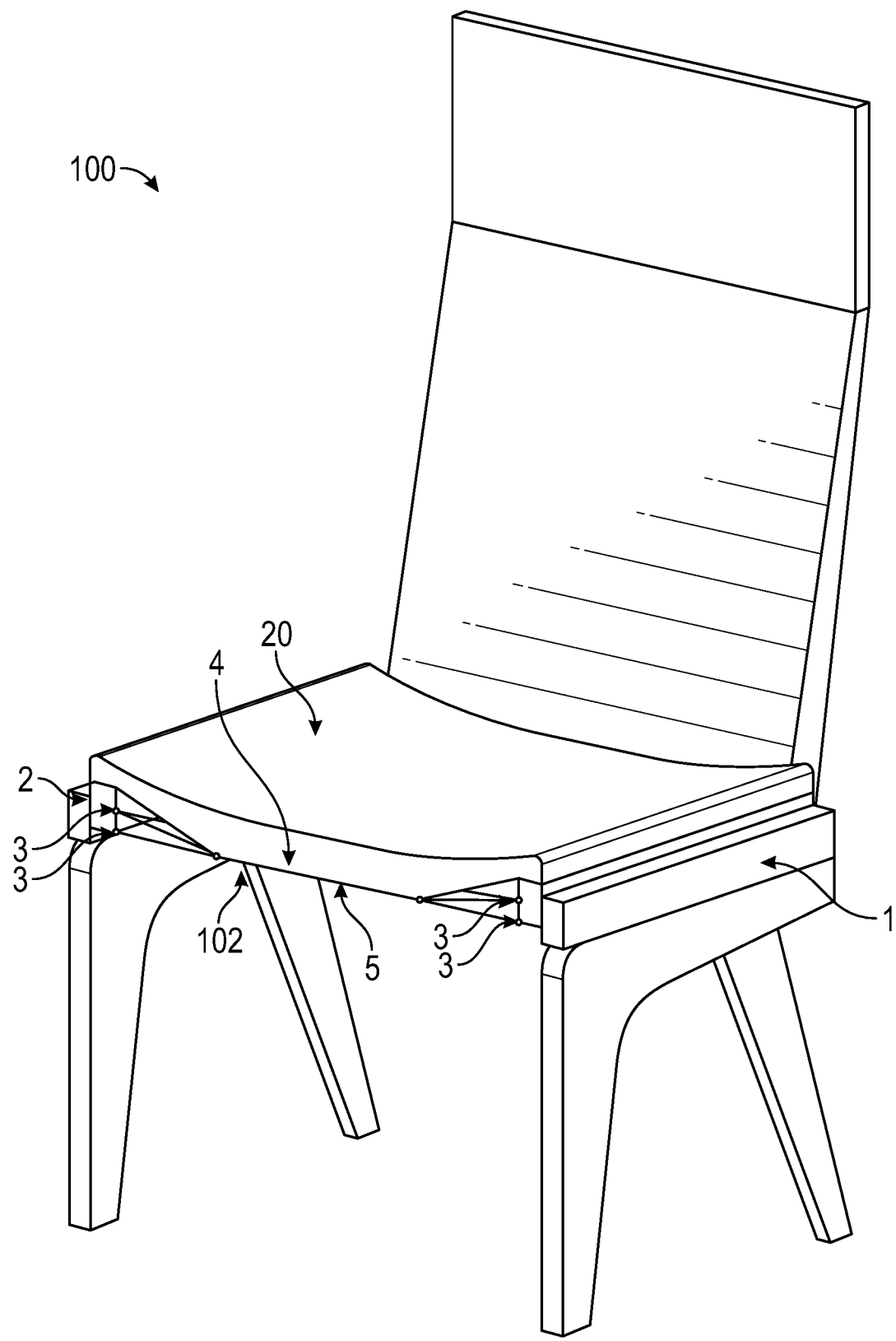
FIG. 1 shows an assembled seat in accordance with the present disclosure.

Before the various embodiments are described in further detail, it is to be understood that the invention is not limited to the particular embodiments described. It is also to be understood that the terminology used is for the purpose of describing particular embodiments only, and it not intended to limit the scope of the claims of the present application.

In the drawings, like reference numerals refer to like features. Accordingly, although certain descriptions may refer only to certain figures and reference numerals, it should be understood that such descriptions might be equally applicable to like reference numerals in other figures.

Referring to FIG. 1, an assembled seat 100 is shown in accordance with the present disclosure. The seat 100 comprises a seat structural frame 1 that includes side members 2 connected to a seat bottom assembly 102 at supporting attachment points 3. The seat structural frame 1 may also include one or more legs and a seat back.

The seat bottom assembly 102 comprises a diaphragm 5 forming a diaphragm suspension seating surface 4. In this embodiment, the seat bottom assembly 102 comprises bolster panels 14 (shown in FIG. 4A), which will be discussed in greater detail below. The diaphragm 5 is made from an open mesh fabric preferably having a leno weave pattern with elastomeric filaments in the warp and low-stretch polyester yarns in the weft. However, other fabric and weave types are within the scope of the present disclosure. The elastomeric filaments are thermally fused at the points where they cross, forming a strong stabilized material. The elastomeric filaments are preferably made of coextruded thermoplastic such as, for example, Hytrel® (fabricated by Dupont De Nemours).

Figure 2:
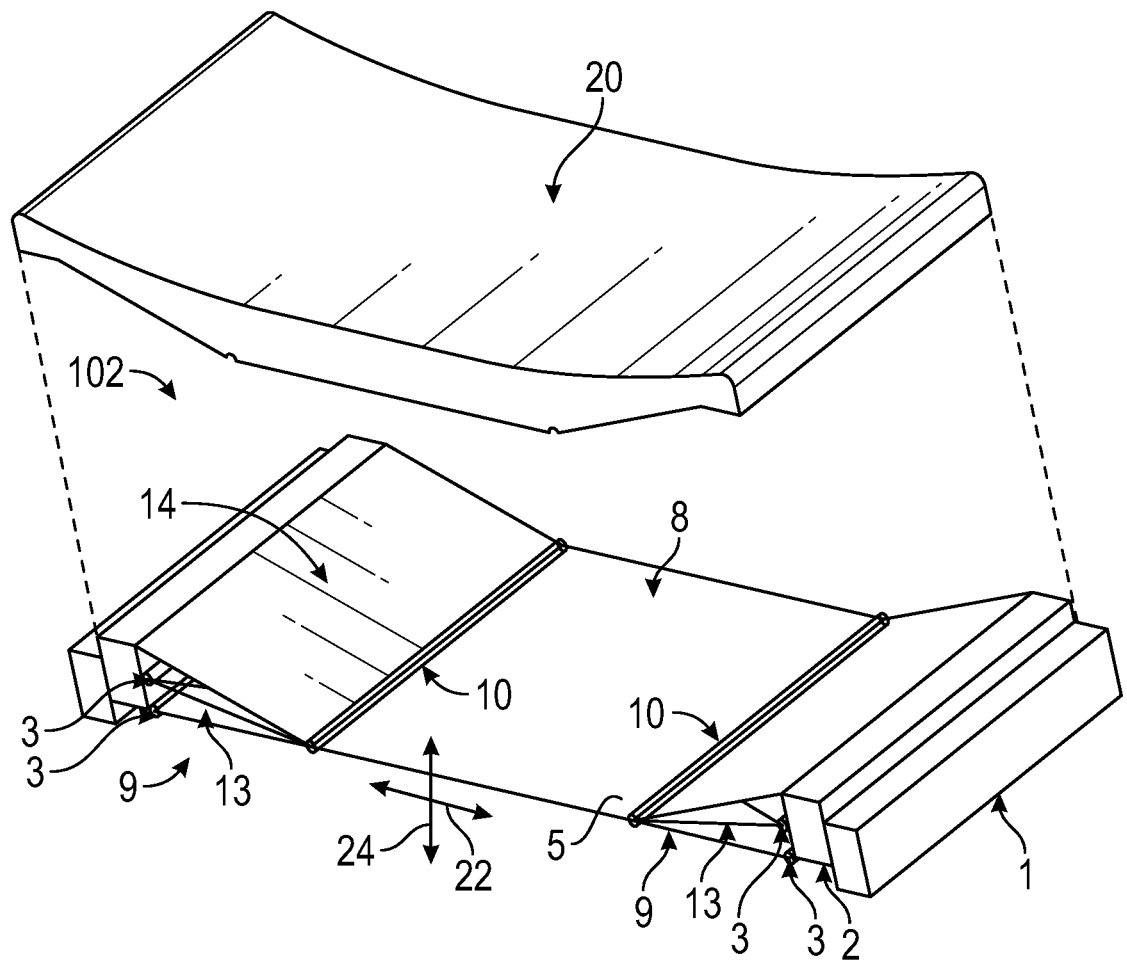
FIG. 2 shows a seat bottom assembly with a cushion of the seat of FIG. 1 in accordance with the present disclosure.
Figure 3:
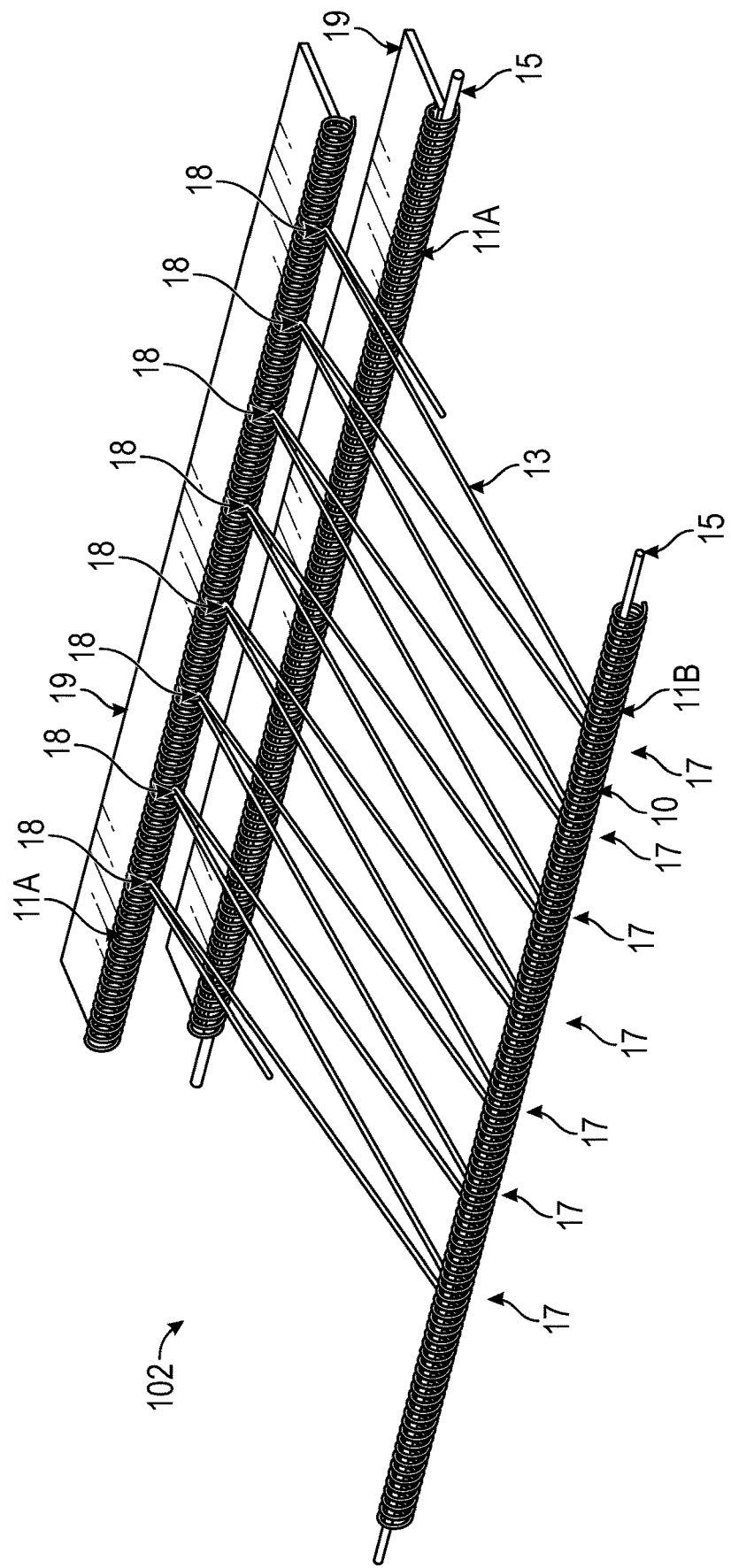
FIG. 3 shows a partial view of the seat bottom assembly of FIG. 2 in accordance with the present disclosure.
Figure 17:
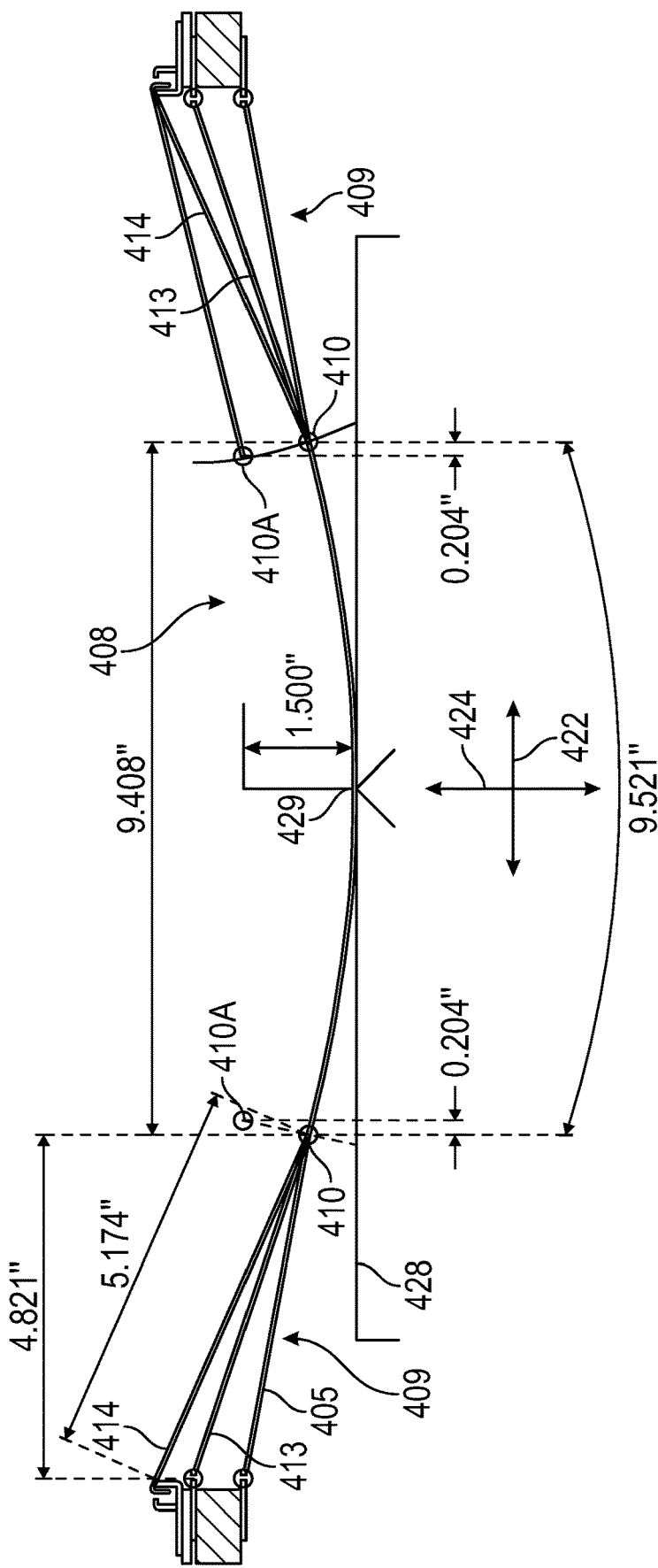
FIG. 17 is a diagram of the diaphragm of FIG. 16 in an occupied state in accordance with the present disclosure.

Referring to FIGS. 2 and 3, the seat bottom assembly 102 of FIG. 1 is shown in accordance with the present disclosure. In FIG. 2, the seat bottom assembly 102 is shown with a cushion 20, and in the partial view of FIG. 3, the seat bottom assembly 102 is shown without a diaphragm 5 and without the cushion 20. The diaphragm 5 is attached to the seat frame 1 side members 2 by attachment coil members 11A (or coiled wires 11A) and supporting attachment points 3 in the form of perforated attachment 19 in accordance with methods and devices described in U.S. Patent Application Publication No. 2017/0283071 A1 (e.g. similar to as shown in FIG. 17 of U.S. Patent Application Publication No. 2017/0283071 A1), which is hereby incorporated by reference in its entirety. In the embodiment of FIGS. 2 and 3, the attachment coil members 11A are threaded through perforations in the perforated attachments 19. The diaphragm 5 includes a main portion 8 and two flank portions 9 on opposite sides of the main portion 8. Junctions 10 are formed into the diaphragm 5 between the main portion 8 and flank portions 9 by winding a junction coil member 11B (or coiled wires 11B) through the open mesh as described in U.S. Patent Application Publication No. 2017/0283071 A1. While FIG. 3 is a partial view, the other portion of the seat bottom assembly 102 is substantially similar and may be mirrored.

Figure 4A:
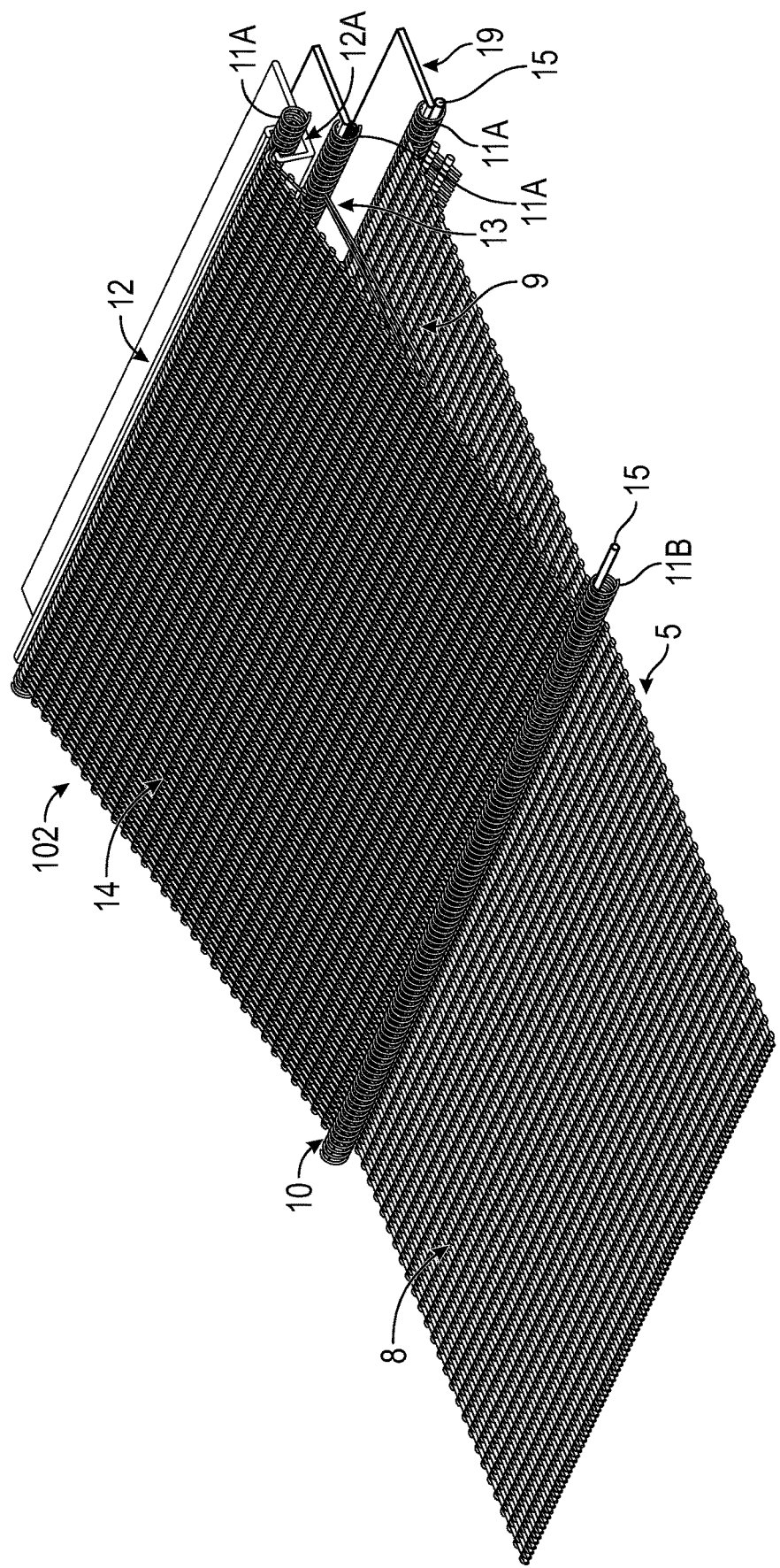
FIG. 4A shows a partial perspective view of the seat bottom assembly of the seat of FIG. 1 in accordance with the present disclosure.
Figure 4B:
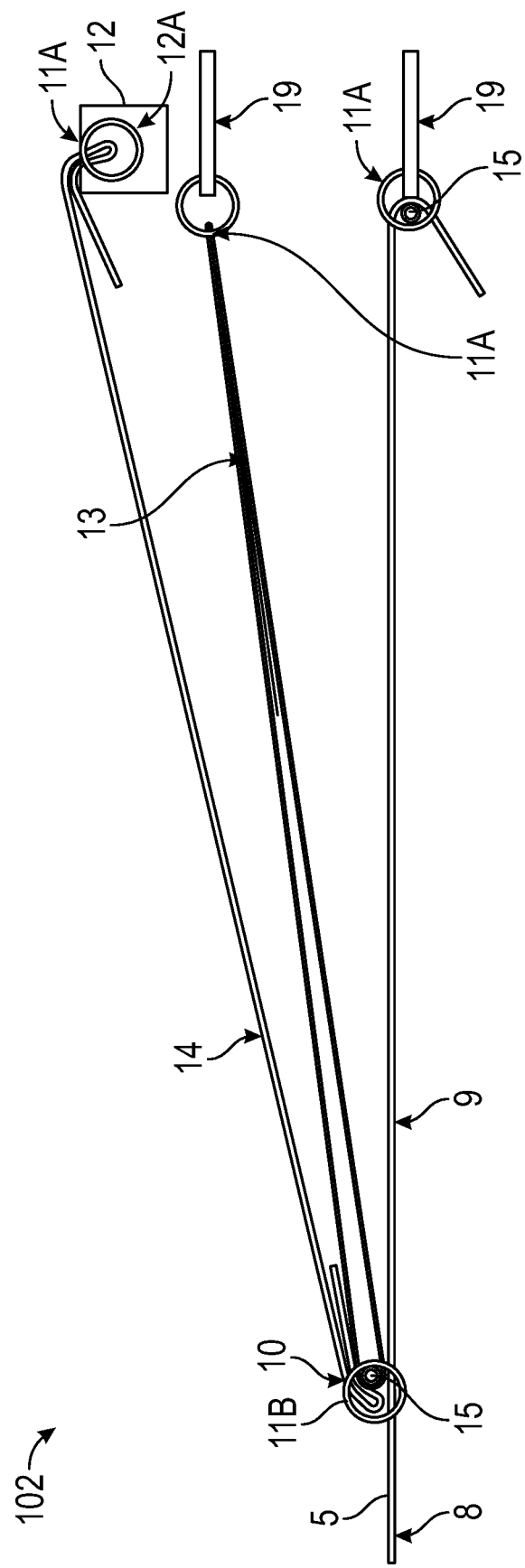
FIG. 4B shows a partial end view of the seat bottom assembly of FIG. 4A in accordance with the present disclosure.
Figure 7:
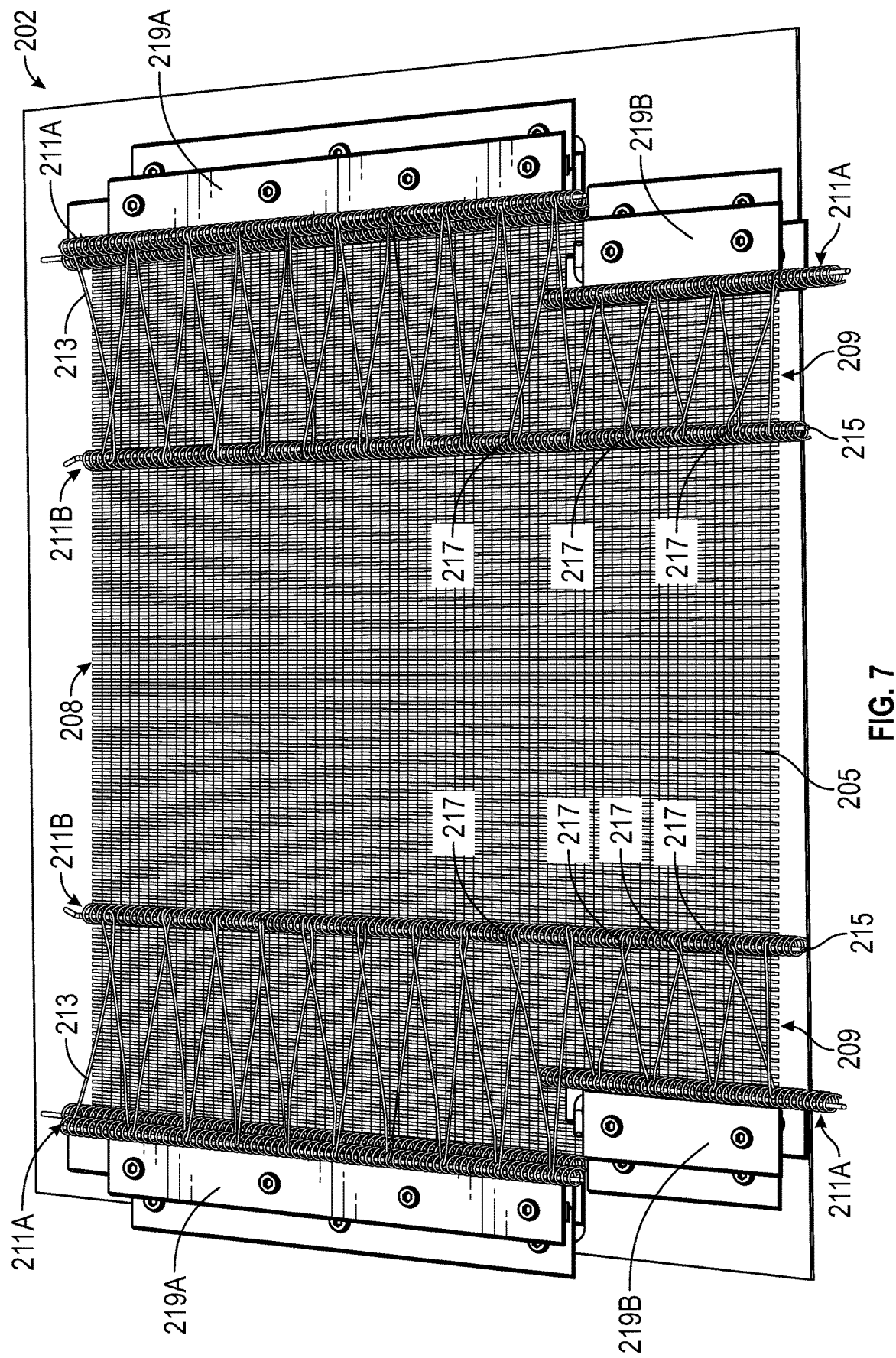
FIG. 7 shows the seat bottom assembly of FIG. 6 with tension-struts in accordance with the present disclosure.

Referring to FIGS. 4A and 4B, partial views of the seat bottom assembly 102 of the seat of FIG. 1 are shown. The seat bottom assembly 102 includes a diaphragm 5 and a supporting attachment point 3 in the form of a channel attachment 12 with connected bolster panel 14 connected with an attachment coil member 11A. The seat bottom assembly 102 comprises the diaphragm 5, attachment coil members 11A, junction coil members 11B, tension-struts 13, bolster panels 14 and engagement wires 15. The seat bottom assembly 102 is shown in a perspective view in FIG. 4A and in an end view in FIG. 4B. The attachment coil member 11A attaches the bolster panel 14 to the channel attachment 12 by being arranged within a channel 12A defined by the channel attachment 12, as described in U.S. Patent Application Publication No. 2017/0283071 A1 (e.g. similar to as shown in FIG. 7 of U.S. Patent Application Publication No. 2017/0283071 A1). The other end of the seat bottom assembly 102 (not shown in FIGS. 4A and 4B) would be the substantially the same with a second bolster panel 14 connected to a second channel attachment 12 with a coil member 11A. The junctions 10 serve to form connection points 17 for tension-struts 13 and bolster panels 14. Tension-struts 13 and bolster panels 14 are secured to the junctions 10 by threading engagement wires 15 along the junctions 10 within the junction coil member 11B. When the diaphragm 5 is formed using this preferred construction, elastomers within the main portion 8 and flank portions 9 remain continuous, preserving filament strength and simplifying construction. The connection points 17 are where the tension-struts 13 are connected to the diaphragm 5 at the junctions 10. Each tension-strut 13 is also connected to a respective perforated attachment 19 by being arranged or threaded through perforations in the respective perforated attachment 19. The attachment coil members 11A join the side edges of the diaphragm 5 to the side members 2. The channel attachment 12 may be an aluminum (AL) perforated strip, but other materials are within the scope of the present disclosure.

While the diaphragm 5 is shown attached to the perforated attachments 19 by the attachment coil members 11A being thread through perforations, it is within the scope of the present disclosure for one or more of the attachment coil members 11A to connect the diaphragm 5 to the side members 2 by being arranged in a channel (e.g. by sliding the attachment coil member 11A) in a manner similar to how the attachment coil member 11A is arranged in the channel 12A of a channel attachment 12 to attach the bolster panel 14 to the side member 2. Similarly, while the bolster panels 14 are shown as being attached to channel attachments 12 by the attachment coil members 11A being arranged in the channel 12A, it is within the scope of the present disclosure for one or more of the attachment coil members 11A connecting the bolster panels 14 to be threaded through perforations in a channel attachment 12, or for the channel attachment 12 to be configured like the perforated attachment 19 without a channel defined therein. Similarly, the attachment coil members 11A connecting the tension-struts 13 to the side members 2 may alternatively be arranged within a channel (similar to channel 12A of channel attachment 12), instead of being threaded through perforations in a perforated attachment 19. Engagement wires (e.g. such as engagement wires 15) may be used wherever an attachment coil member 11A connects a diaphragm 5 or bolster panel 14 to a side member 2 at a perforated attachment 19 (or channel attachment 12 with perforations).

Engagement wires 15 pass through partial loops 16 in the tension-struts 13 and bolster panels 14 where they intersect the attachment coil member 11A or junction coil member 11B. The engagement wires 15 are preferably tempered stainless steel (SST) or polycarbonate (PC) monofilament. However, other materials such as, for example, plastic monofilament cord may be used. Tension-struts 13 can be straps having enough tenacity as to be inextensible (or substantially inextensible). Cords or cables can also be used; in preferred embodiments, the cords or cables will not stretch more than approximately 1% of their length when the weight of the occupant is applied. Cables made of high tenacity fibers such as Kevlar® (manufactured by DuPont de Nemours, Inc.), Spectra® (manufactured by Honeywell International Inc.), and Vectran® (manufactured by Kuraray America, Inc.) can be used. In some embodiments, the flank portions 9, junctions 10, and tension-struts 13 may be installed on only a portion of the diaphragm 5 rather than along the entire fore and aft length of the diaphragm 5.

The portion of seat bottom assembly 102 shown in FIG. 3 is for supporting the diaphragm 5 at one side of the main portion 8. A second, substantially similar (or identical) portion of the seat bottom assembly 102 is arranged on an opposite side of the diaphragm 5 main portion 8.

In some embodiments, the tension-struts 13 are mounted so as to be rotatable about pivots 18. For instance, each tension-strut 13 may pivot at points 18 by being attached to the attachment coil member 11A itself, or by being attached to an engagement wire 15 arranged within the attachment coil member 11A in a manner similar to how the tension-strut 13 engages the engagement wire 15 arranged within the junction coil member 11B. Configuring the tension-strut 13 to pivot at points 18 allows for movement of the tension-strut 13 when the diaphragm 5 is deflected, for example, while supporting an occupant. The diaphragm 5 may be installed with an initial tension of between 5% and 20% stretch. That is, the diaphragm 5 is constructed to have a free overall widthwise length (i.e. a widthwise length when the diaphragm is not yet installed under tension) in a width direction 22 that is 5%-20% shorter than the distance between supporting attachment points 3. However, other initial tension ranges are within the scope of the present disclosure. At rest, the load of the tensioned diaphragm main portion 8 and flank portions 9 is transferred to the seat frame side members 2 by the flank portions 9 extending from junctions 10 to channel attachments 12, and tension-struts 13 extending from the junctions 10 to the perforated attachments 19, and bolster panels 14.

When the occupant's weight depresses diaphragm 5 during use of the seat, the angle between the main portion 8 and tension-struts 13 changes as to cause a greater portion of the load to be transferred to the frame side members 2 through the tension-struts 13. As the diaphragm 5 is depressed downwards in a vertical direction 24 (perpendicular to the width direction 22), the tension-struts 13 rotate about the pivot points 18. Because the tension-struts 13 are inextensible (or substantially inextensible), connection points 17 are made to follow a path that moves them downward and farther apart which increases the distance between junctions 10 and thus the main portion 8 of the diaphragm 5 between them must elongate.

Figure 5:
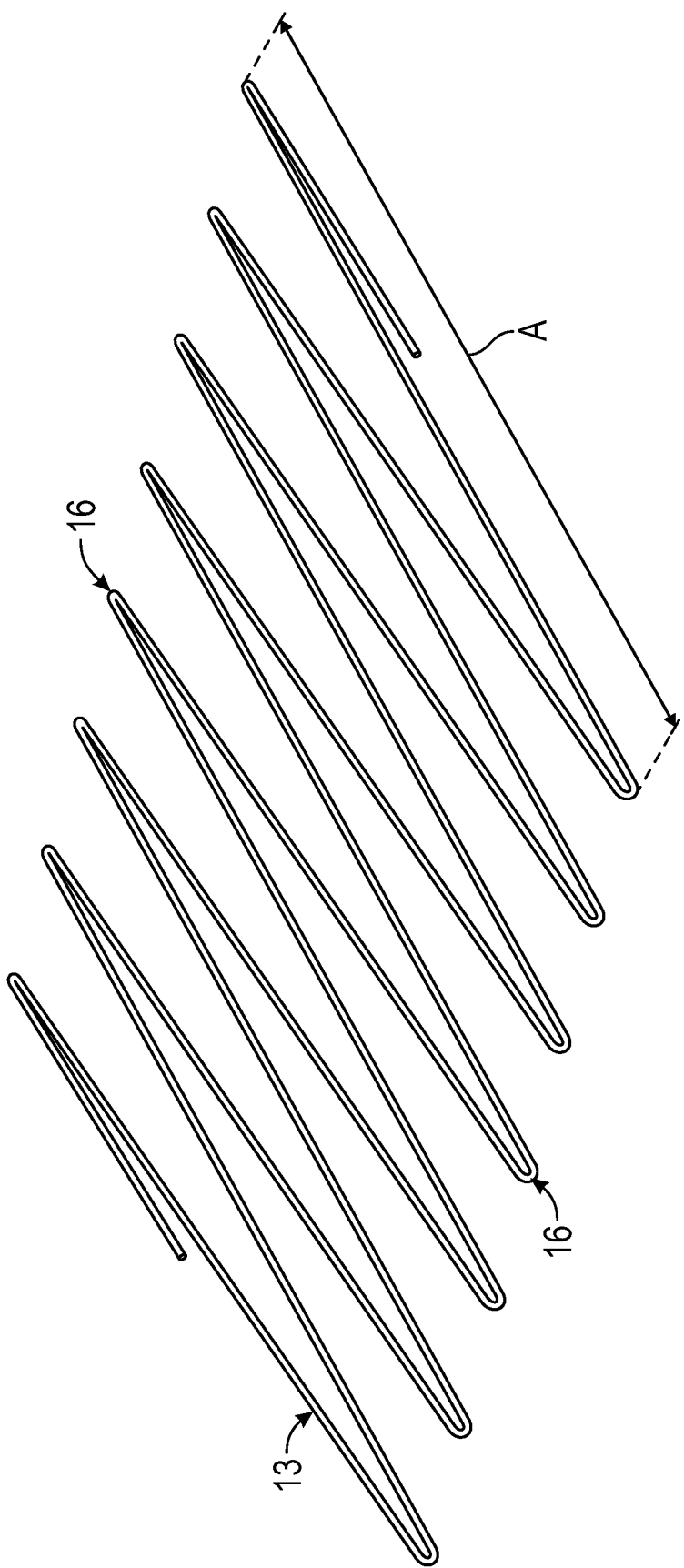
FIG. 5 shows a tension-strut of FIG. 3 in accordance with the present disclosure.

Referring to FIG. 5, a tension-strut 13 of FIG. 3 is shown in accordance with the present disclosure. The tension-strut 13 has a wave-like structure forming a plurality of waves with the partial loops 16 formed at the crest and troughs of the waves. In this embodiment, the amplitude A of each wave is the same (or substantially the same) throughout the length of the tension-strut 13, with the exception of the ends which have a partial wave length (in other embodiments the tension-struts 13 may have full wave length at the ends).

Figure 6:
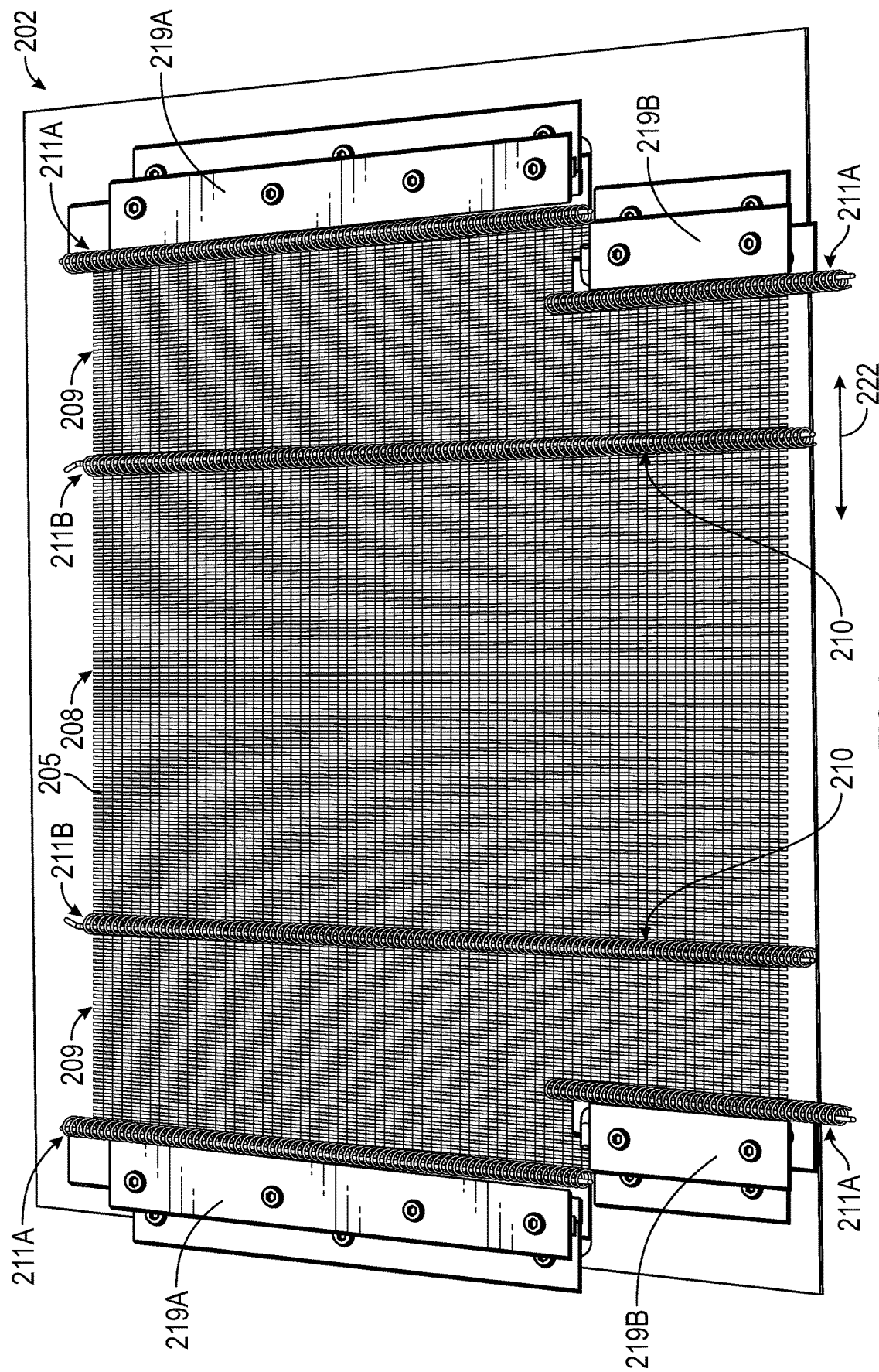
FIG. 6 shows an exemplary seat bottom assembly without tension-struts in accordance with the present disclosure.

Referring to FIG. 6, another exemplary embodiment of a seat bottom assembly 202 is shown in accordance with the present disclosure. For clarity, the seat bottom assembly 202 is shown without any tension-struts installed. The seat bottom assembly 202 comprises a diaphragm 205 with a main portion 208 located between flank portions 209. The diaphragm 205 connects to two pairs of perforated attachments 219A, 219B through two pairs of attachment coil members 211A (or coiled wires 211A). One pair of perforated attachments 219A is farther away from each other in a width direction 222 than the other pair of perforated attachments 219B. The flank portions 209 are wider in the width direction 222 in the region of one pair of perforated attachments 219A than width of the flank portions 209 in the regions of the other pair of perforated attachments 219B. The coiled wires 211A thread through perforations in the perforated attachments 219A, 219B as discussed above in connection with the embodiment of FIG. 1, and will not be repeated. The seat bottom assembly 202 further comprises junction coil members 211B forming junctions 210 in the diaphragm 205.

Figure 8:
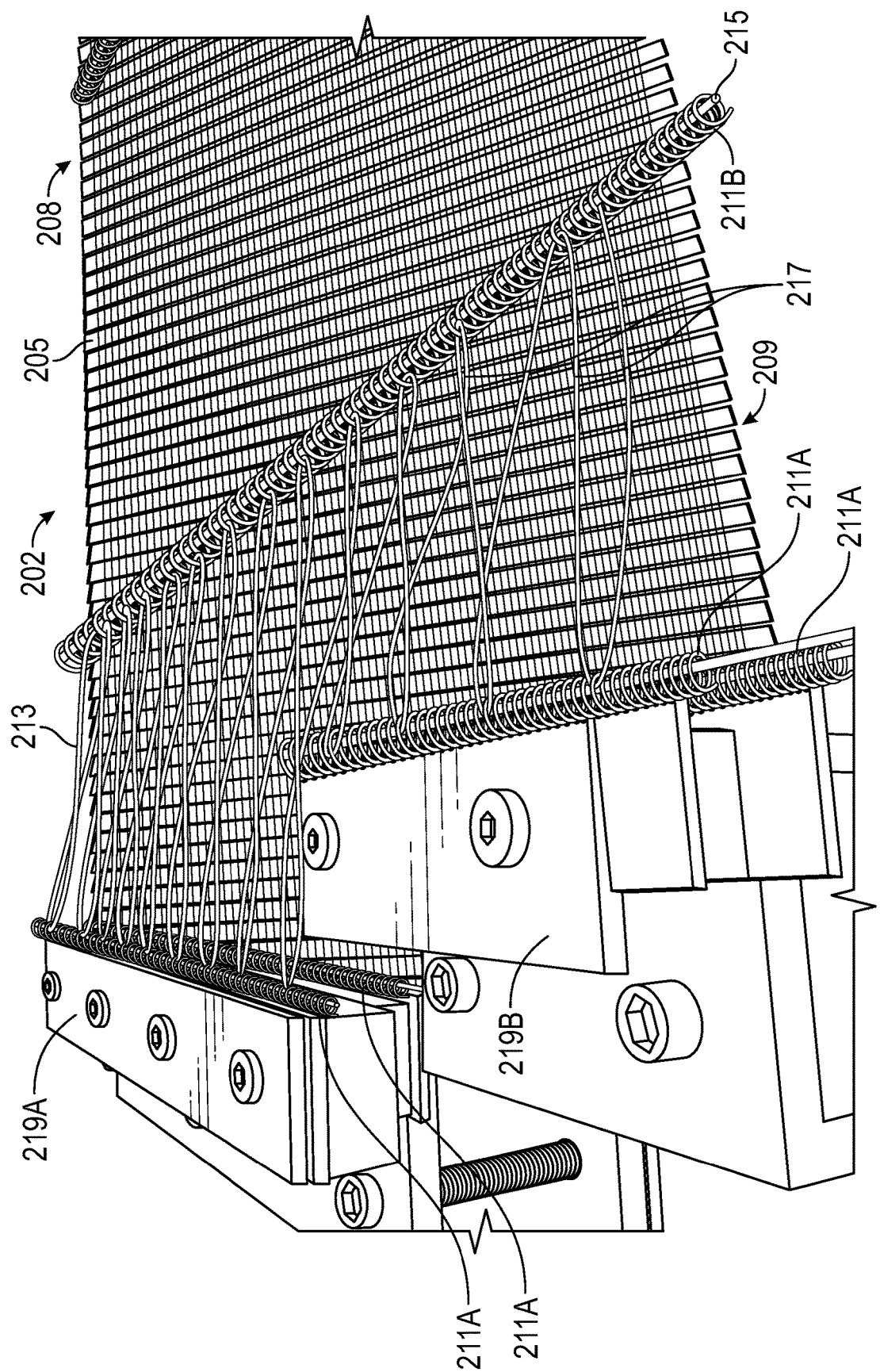
FIG. 8 shows a partial view of the seat bottom assembly of FIG. 7 in accordance with the present disclosure.

Referring to FIGS. 7 and 8, the seat bottom assembly 202 of FIG. 6 is shown with tension-struts 213 installed therein in accordance with the present disclosure. The tension-struts 213 connect to the coiled wires (attachment coil members) 211A and engagement wires 215 as discussed above in connection with the embodiment of FIG. 1, and will not be repeated.

Figure 9:
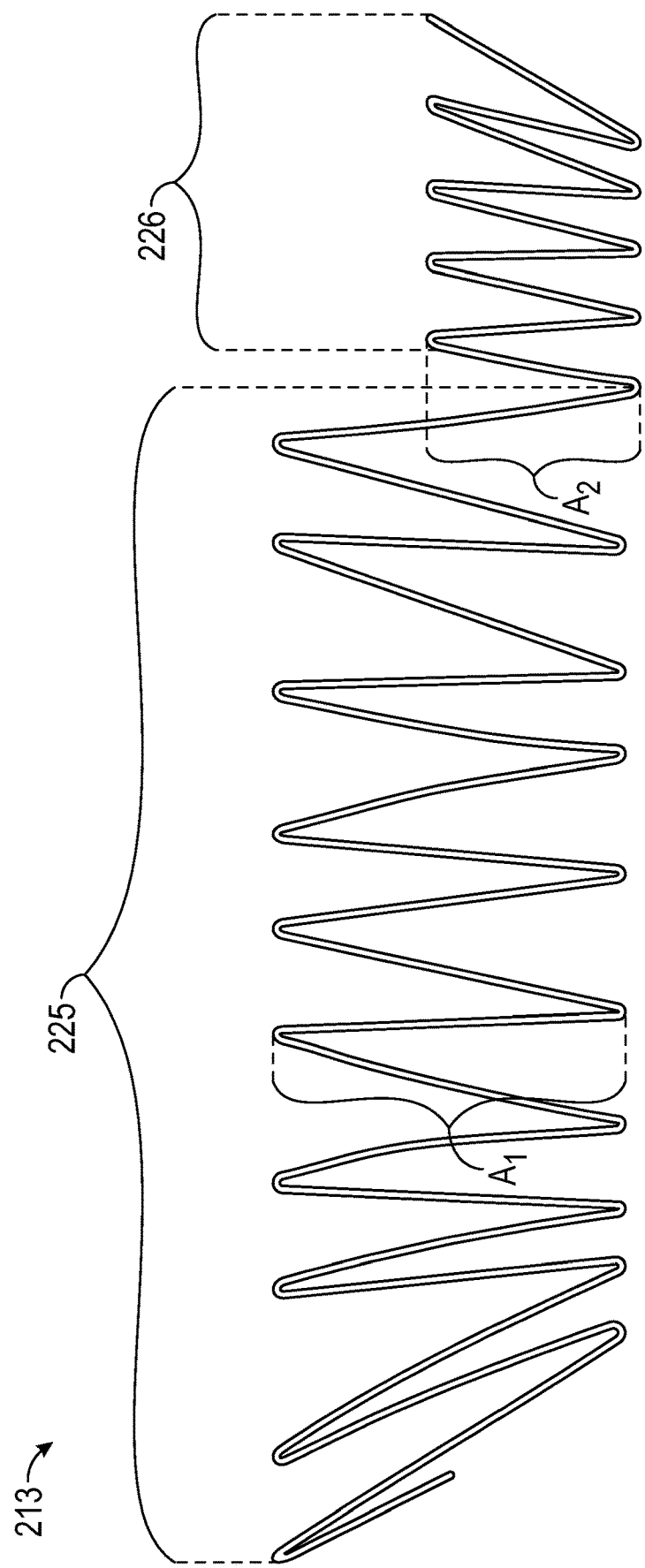
FIG. 9 shows a tension-strut of the seat bottom assembly of FIG. 7 in accordance with the present disclosure.
Figure 10:
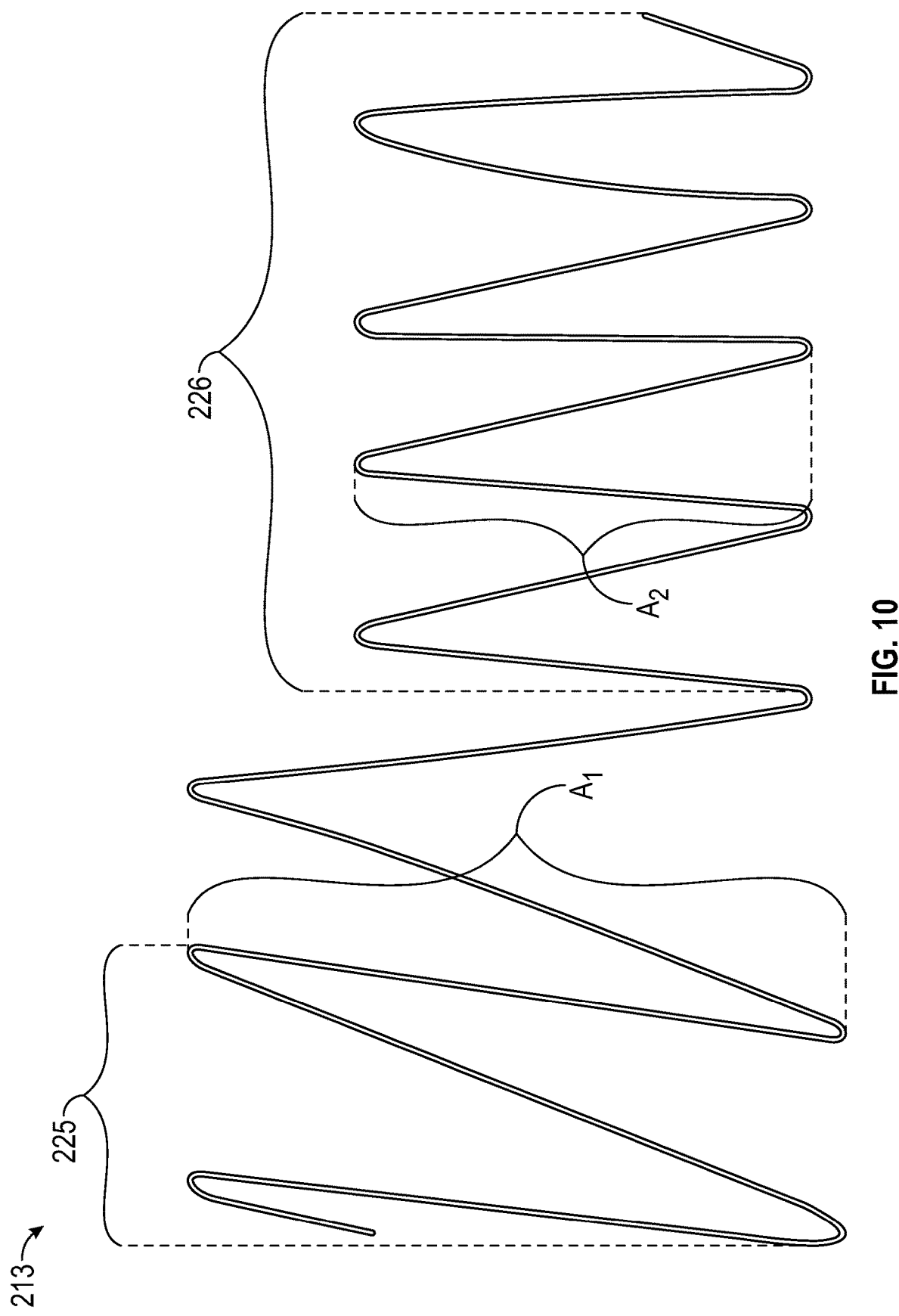
FIG. 10 is a partial view of the tension-strut of FIG. 9 in accordance with the present disclosure.

Referring to FIGS. 9 and 10, one of the tension-struts 213 of FIGS. 7 and 8 is shown in accordance with the present disclosure. For convenience, the tension-strut 213 is illustrated in FIGS. 9 and 10 as being arranged flat within a plane; however the tension-strut 213 would not actually be arranged flat when installed in a seat bottom assembly as seen in FIGS. 7 and 8. The tension-strut 213 has a first section 225 comprising a first plurality of waves and a second section 226 comprising a second plurality of waves. The waves in the first plurality of waves of the first section 225 have the same (or substantially the same) amplitude $A_1$ and the waves in the second plurality of waves of the second section 226 have the same (or substantially the same) amplitude $A_2$, the first amplitude $A_1$ being larger than the second amplitude $A_2$. When installed, the waves of the first section 225 connect to one of the perforated attachments 219A and the engagement wire 215, and the waves of the second section 226 connect to the other of the attachments 219B and the engagement wire 215.

Figure 11:
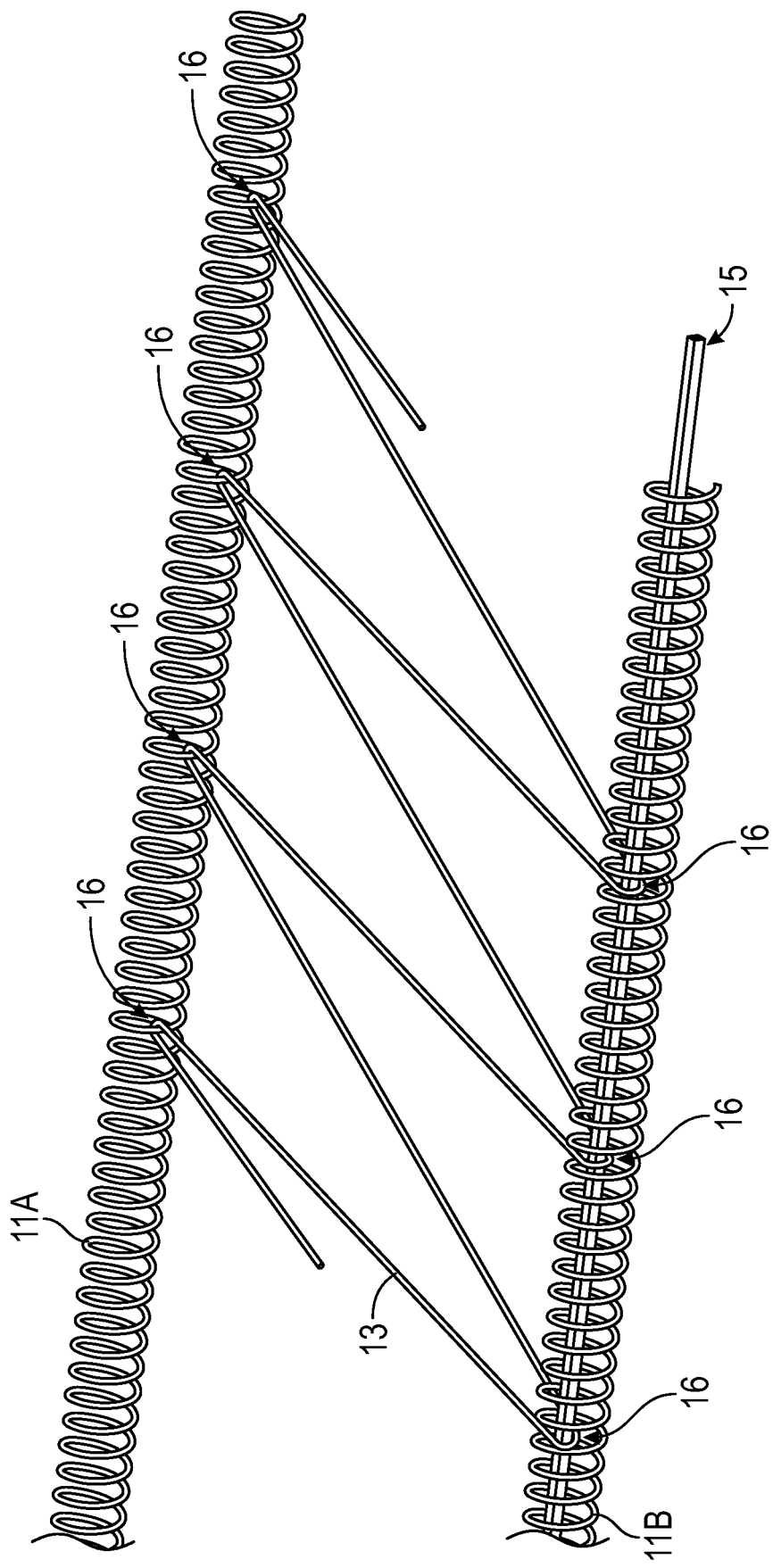
FIG. 11 shows a portion of the seat bottom assembly of FIG. 3 without a diaphragm in accordance with the present disclosure.
Figure 12:
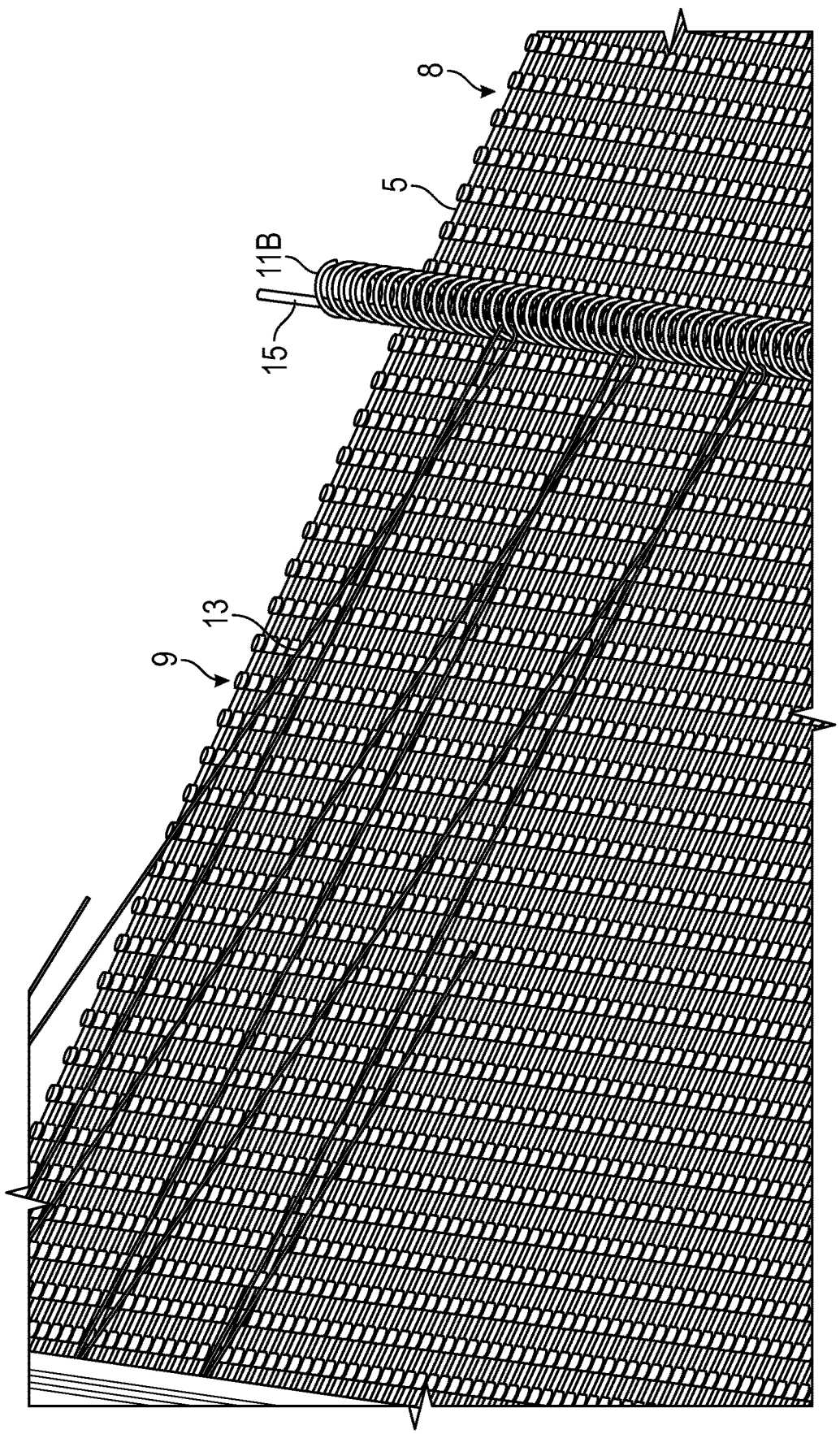
FIG. 12 shows a different view of the seat bottom assembly of FIG. 11 with a diaphragm in accordance with the present disclosure.

Referring to FIG. 11, shows a portion the seat bottom assembly 102 of FIG. 3 with the tension-strut 13 (only portion of tension strut-13 shown in FIG. 11) engaged with the attachment coil member 11A and junction coil member 11B of FIG. 3. In embodiments according to the present disclosure, the tension-strut 13 may be attached to the attachment coil member 11A by threading the attachment member through the partial loops 16 in the tension-strut 13. While FIG. 11 shows the connection of the tension-strut 13 of the FIG. 3 embodiment, this connection type is applicable to other embodiments, such as the FIG. 6 embodiment. Referring to FIG. 12, another view of the tension-strut 13 of FIG. 11 is shown with a diaphragm 5 included. As seen in FIG. 12, the tension-strut 13 is twisted to align the tension-strut 13 with the engagement wire 15 (i.e. stainless steel wire or other wire filament type). Specifically, the waves of the tension-struts 13 are twisted to such that partial loops 16 are aligned perpendicular to the coils of the attachment coil member 11A and alternate partial loops 16 are aligned perpendicular to engagement wire 15 (similar to the partial loops 16 engaged with coil member 11A but arranged perpendicularly to those partial loops 16). In other words, horizontal partial loops 16 engage the attachment coil member 11A and vertical partial loops 16 engage the engagement wire 15 on the junction coil member 11B side.

Figure 13:
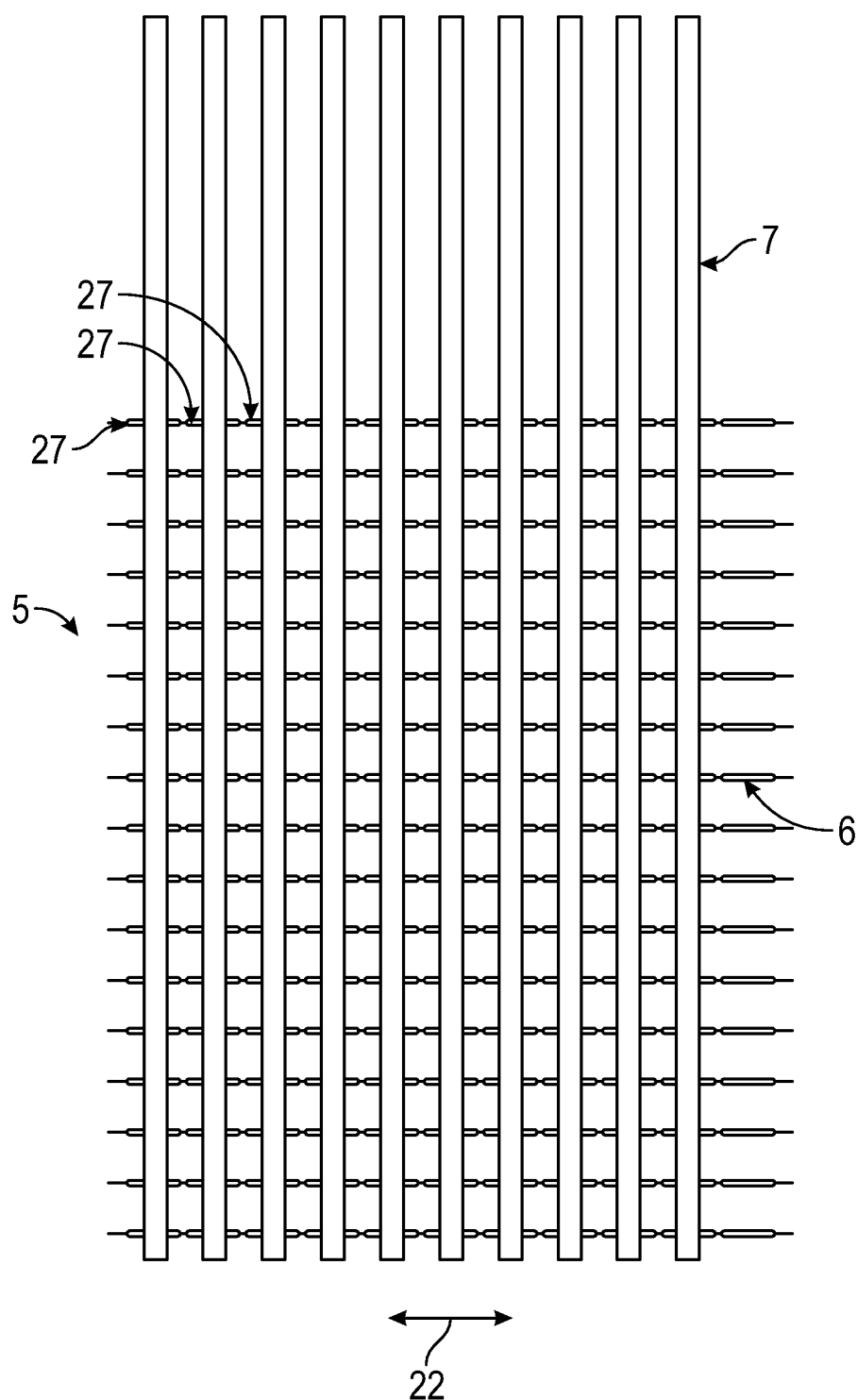
FIG. 13 is an illustration of a portion of the diaphragm of FIG. 2 in accordance with the present disclosure.

Referring to FIG. 13, an illustration of a portion of the diaphragm 5 of FIG. 2 is shown in accordance with the present disclosure. The diaphragm 5 is made from an open mesh fabric, preferably having a leno weave pattern, with elastomeric filaments 6 in the warp and low-stretch polyester yarns 7 in the weft. The elastomeric filaments 6 are thermally fused at the points 27, where they cross, forming a strong stabilized material. The elastomeric filaments 6 are preferably made of coextruded thermoplastic such as, for example and without limitation, Hytrel® (fabricated by Dupont De Nemours). The double arrow 22 shows the width direction of the diaphragm 5.

Figure 14:
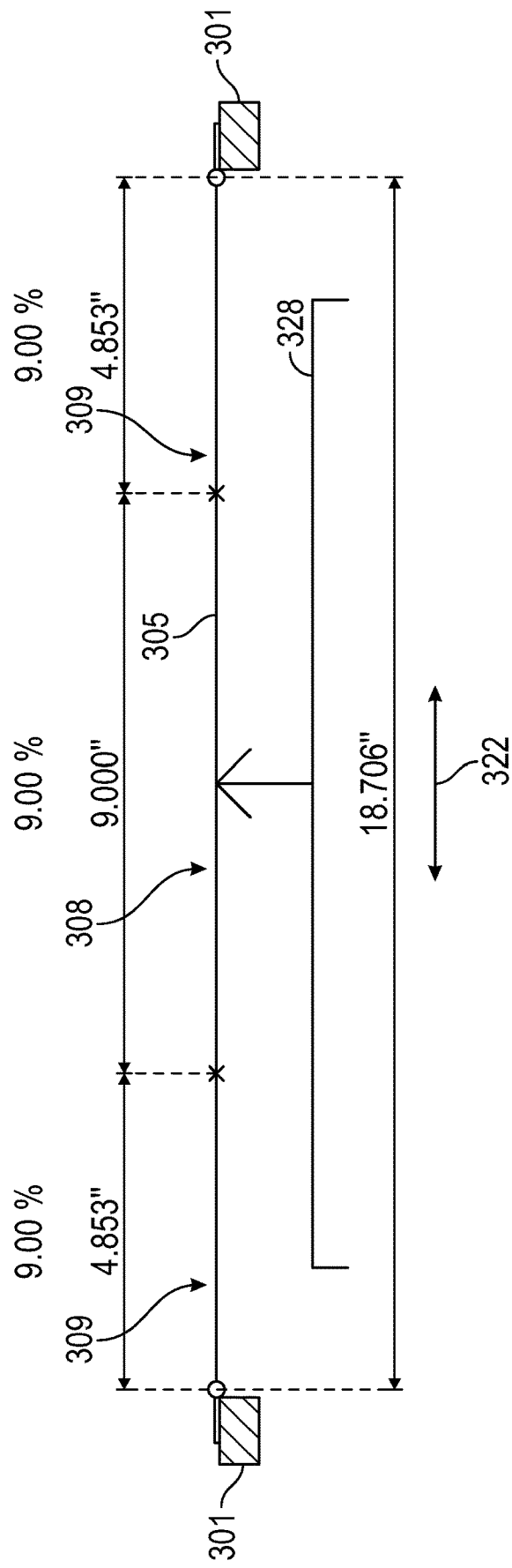
FIG. 14 is a diagram of a diaphragm without tension-struts in an unoccupied state in accordance with the present disclosure.

Referring to FIG. 14, a diagram of an example diaphragm 305 of a seat bottom assembly without tension-struts of the present disclosure is shown above a beam or structure 328 (e.g. of the seat). FIG. 14 illustrates the diaphragm 305 in an unoccupied state with a pre-tension of 9.00% between sides of a seat frame 301. The load capacity of a mesh of the diaphragm 305 is approximately 27 lb/in (perpendicular to the direction of stretch) at 14.5%. For reference, for a diaphragm that is 10 inches wide and 5 inches long, when the diaphragm is stretched to 11.45 (i.e. 10+(14.5% of 10)) the load capacity would be 5 times 27 lbs. The length of the diaphragm 305 in the width direction 322 is 18.706 inches, 9.000 inches of length at a main portion 308 and 4.583 inches of length at flank portions 309. The 9.00% tension is present in each portion 308, 309 of the diaphragm 305.

Figure 15:
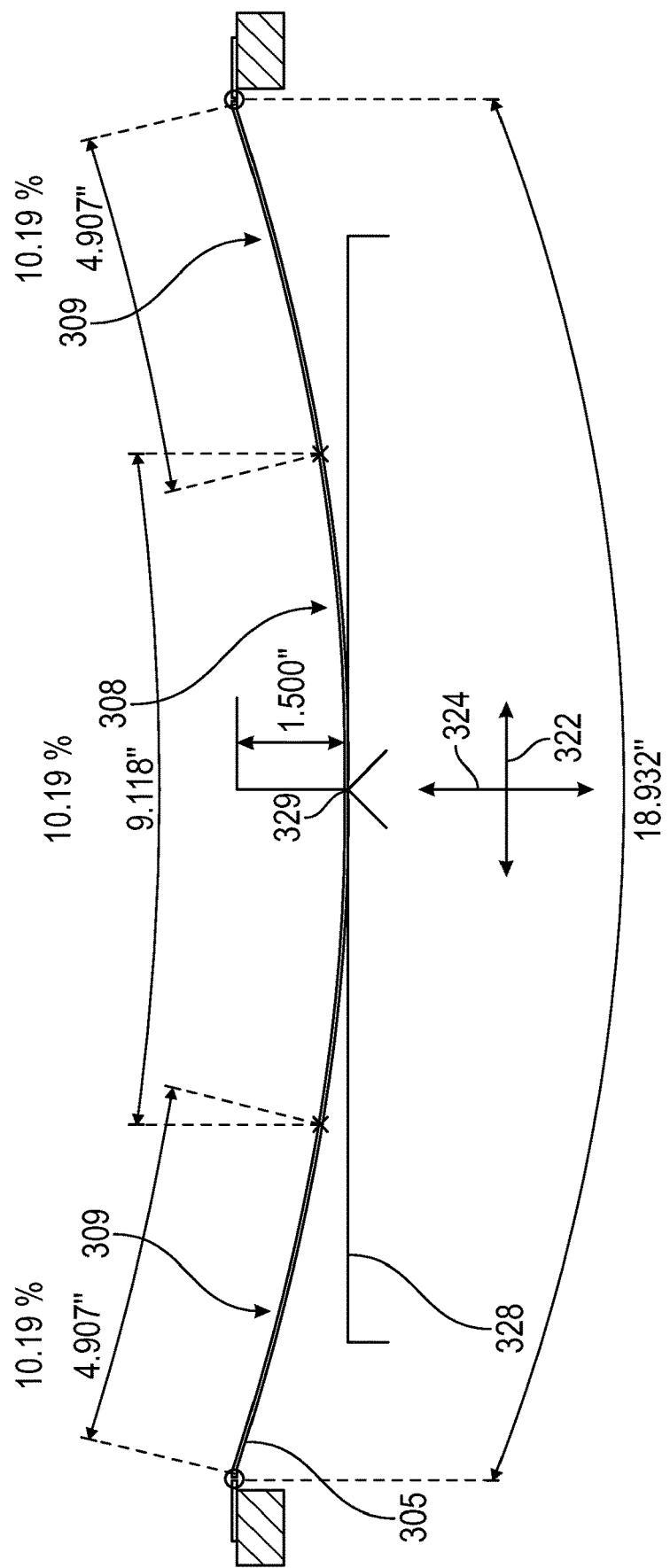
FIG. 15 is a diagram of the diaphragm of FIG. 14 in an occupied state in accordance with the present disclosure.

Referring to FIG. 15, the diaphragm 305 of FIG. 14 is shown in an occupied state (e.g. occupied by an occupant sitting on the seat). In this occupied state, the diaphragm 305 is deflected downwards in the vertical direction 324 by a distance of 1.500 inches at a center point 329 of the diaphragm 305 in the width direction 322, thereby stretching the diaphragm 305 and increasing the tension to 10.19%. The 10.19% tension is present in each portion 308, 309 of the diaphragm 305. The 1.500 inches of deflection is the maximum amount in this embodiment because of the position of the beam/structure 328 relative to the diaphragm 305 in the unoccupied state, but other distances of maximum deflection are within the scope of the present disclosure. The stretched length of the deflected diaphragm 305 is 18.932 inches, 9.118 inches at the main portion 308 and 4.907 inches in the flank portions 309. The additional stretch in the diaphragm 305 is 0.226 inches, which is approximately a 1.2% increase from the unoccupied state of FIG. 14.

The 9.00% pre-tension and 10.19% tension are calculated as follows:
 diaphragm free length=17.0227 inches;
 unoccupied stretched length=18.7063 inches @ 9.00% pre-tension;
 occupied deflected arc length=18.9323 inches;
 additional percentage of stretch:
  18.7063=18.9323=0.9881;
  100−98.81=1.19%;
 total stretch on diaphragm=9.00+1.19=10.19%; and
 load capacity of diaphragm mesh @ 10.19%=~19.0 lb/in.

The reference load capacity of mesh is approximately 27 lb/in at 14.5% tension. Tension increase assumes near linear stress/strain as shown by material data.

Figure 16:
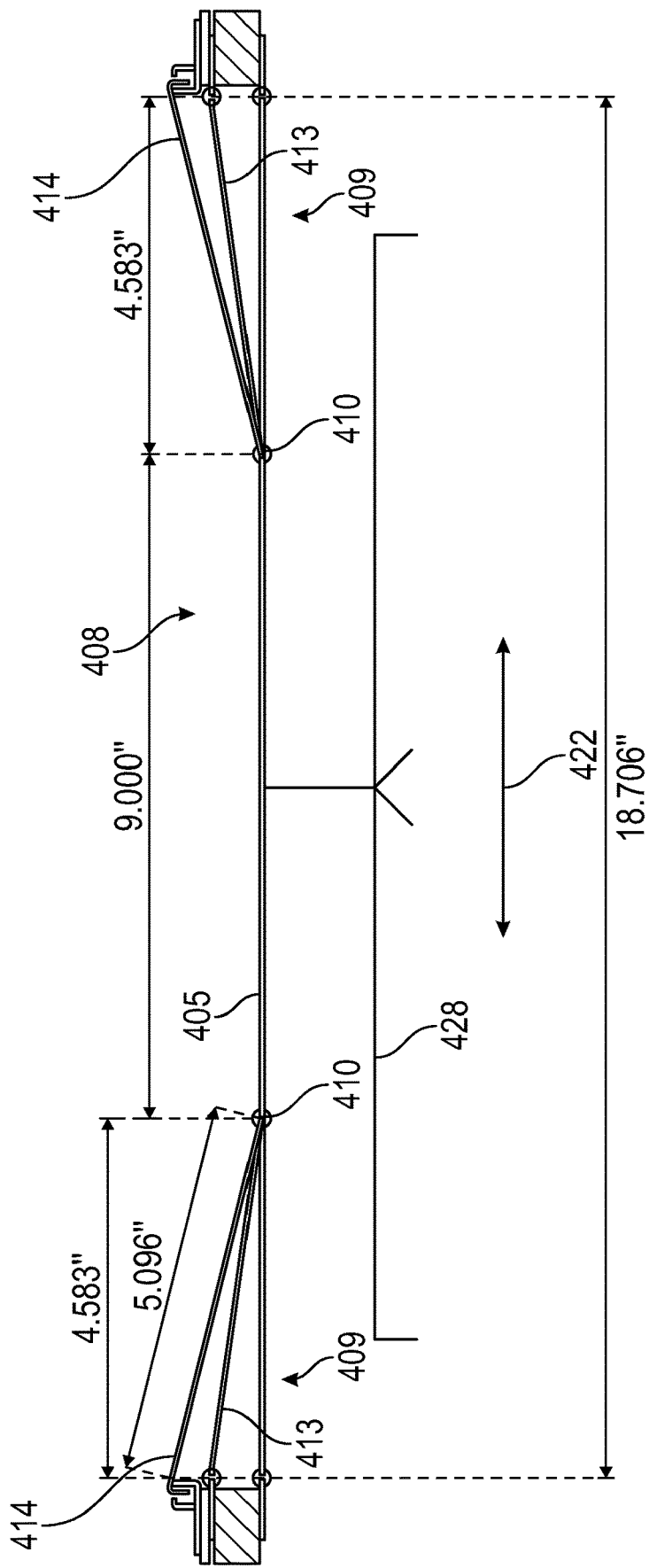
FIG. 16 is a diagram of a diaphragm with tension-struts in an unoccupied state in accordance with the present disclosure.

Referring to FIG. 16, a diagram of an exemplary diaphragm 405 with tension-struts 413 and bolster panels 414 in accordance with the present disclosure above a beam or structure 428. The tension-struts 413 connect to junctions 410 as discussed above in connection with other embodiments. The diagram illustrates the diaphragm 405 in an unoccupied state with a pre-tension of 9.00%. The length of the diaphragm 405 in the width direction 422 is 18.706 inches, 9.000 inches of length at a main portion 408, 4.583 inches of length at a first flank portion 409 (left side in FIG. 16) and 4.583 inches at a second flank portion 409 (right side in FIG. 16). The 9.00% tension is present in each portion 408, 409 of the diaphragm 405. The bolster panels 414 are attached to the frame 1.251 inches above the connection point of the diaphragm 405.

Referring to FIG. 17, the diaphragm 405 of FIG. 16 is shown in an occupied state (e.g. occupied by an occupant sitting on the seat). In this occupied state, the diaphragm 405 is deflected downwards in the vertical direction 424 by a distance of 1.500 inches at a center point 429 of the diaphragm 405 in the width direction 422, thereby stretching the main portion 408 of the diaphragm 405 and increasing the main portion 408 tension to 14.37%, an increase of 5.37%. Due to the tension-struts 413, the effective length of stretchable material of the diaphragm 405 is the 9.000 inches of the main portion 408 (pre-stretch); which is less than the 18.076 inches of effective length of stretchable material of the diaphragm 305 of FIG. 14 without tension-struts. Similar to the FIG. 14 embodiment, the 1.500 inches of deflection is the maximum amount of allowable deflection in this embodiment because of the position of the beam/structure 428 relative to the diaphragm 405 in the unoccupied state, but other distances of maximum deflection are within the scope of the present disclosure. The stretched length of the main portion 408 of the deflected diaphragm 405 is 9.521 inches. The load capacity of a mesh of the diaphragm 405 is approximately 27 lb/in at 14.5%.

In the occupied state, the junctions are rotated to 9.408 inches apart, which is an increase of 0.408 inches from the distance in the unoccupied state of FIG. 16 (or 0.204 inches of displacement for each junction). The diagram of FIG. 17 shows the original position 410A of the junctions 410 in the unoccupied state (i.e. FIG. 16).

The 9.00% pre-tension and 14.37% tension are calculated as follows:
 unoccupied diaphragm width=18.706 inches (main portion and flank portions);
 main portion pre-tensioned length=9.000 inches @ 9.00% stretch;
 flank width=4.867 inches;
 bolster width=5.026 inches
 bolster height=1.251 inches;
 occupied main portion tensioned arc length=9.5211 inches (based on uniform arc length);
 tension-struts rotate junctions to 9.0477 inches apart (or 0.2039 inches displacement per side);
 additional percentage of stretch:
  9.0000−9.5211=0.9463;
  100.00−94.63=5.37%;
 total stretch on main portion=9.00+5.37=14.37%; and
 load capacity of mesh @ 14.37%=~26.8 lb/in.

The reference load capacity of mesh is approximately 27 lb/in at 14.5% tension. Tension increase assumes near linear stress/strain as shown by material data.

In some embodiments, the attachment coil members (e.g. 11A) and/or the junction coil members (e.g. 11B) are coiled wire such as, for example and without limitation, a SLIM™ attachment manufactured by Franklin Products.

In some embodiments, the tension-struts are attached as described above, but are sized to achieve a slack condition when the seat is unoccupied. To achieve a slack condition, the tension-struts may be formed with bends that straighten to provide extra length or are made long enough to be slightly longer than the distance from the pivot points to the junctions. In some embodiments according to the present disclosure, to preserve function, all slack and ability to lengthen is removed and the tension-struts are made inextensible before the diaphragm is depressed more than 25% of its total deflection. However, other percentages of total deflection are within the scope of the present disclosure. If the tension-struts 13 are sized without slack, the flank portions 9 will not stretch at all when supporting an occupant. If the tension-struts 13 have a certain amount of slack, the flank portions 9 will stretch somewhat (or slightly) due to the deflection of the junctions 10 as described above in connection with FIGS. 16 and 17. The amount of slack provided (or not provided) in the tension-struts 13 allows for control or selection of the point at which increased support begins when the diaphragm 5 is deflected due to the effective stretch being limited (or substantially limited) to the main portion 8.

Figure 18:
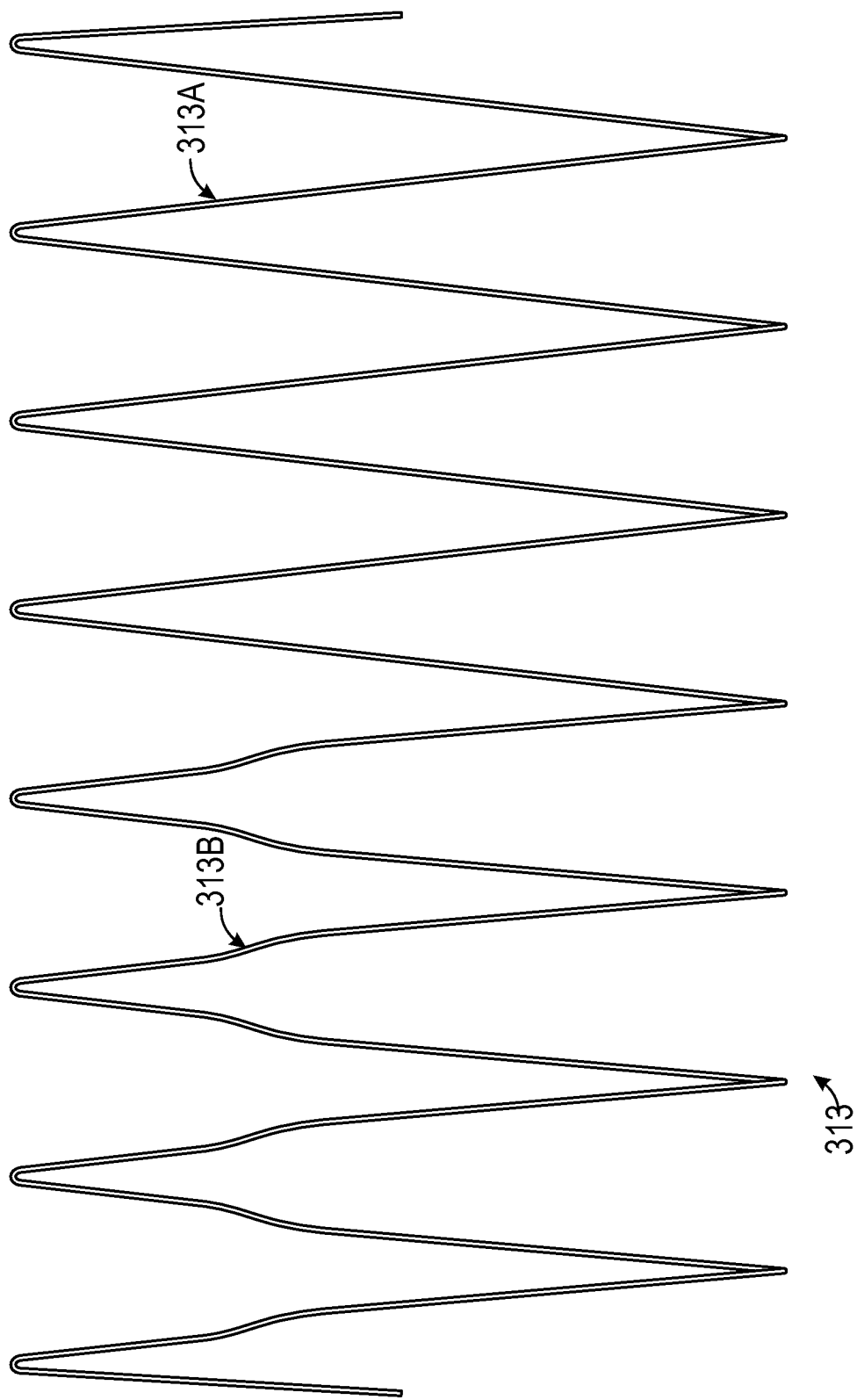
FIG. 18 shows a tension-strut in accordance with the present disclosure.

Referring to FIG. 18, a tension-strut 313 that is configured to achieve the slack condition described above is shown in accordance with the present disclosure. The tension-strut 313 includes straight segments 313A and bend segments 313B. The bend segments 313B allow a certain amount of elongation before becoming inextensible. A section comprising one or more waves of the tension-strut 313 does not need to have bend segments 313B. Portions of straight segments 313A and bend segments 313B can be provided in a tension-strut 313 to provide predefined or preset levels of tensioning along the length of a diaphragm. For example, as shown in FIG. 18, a front section which typically carries less of the occupant's weight (left side in FIG. 18) having a plurality of waves of the tension-strut 313 can be made to be less supportive than a rear section (right side in FIG. 18) having a plurality of waves including straight segments 313A, by including a plurality of waves having bend segments 313B. The straight segments 313A may be inextensible, while the bend segments 313B may become inextensible after straightening when supporting the weight of an occupant. Accordingly, the section of the tension-strut 313 having bend segments 313B is extensible for the amount of distance the tension-strut 313 elongates when the bend segments 313B straighten when supporting an occupant. The section(s) of the tension-strut 313 having bend segments 313B cause less tension in the diaphragm in the area where that section(s) of the tension-strut 313 supports the diaphragm.

While the diaphragm suspension seating surface 4 has been described above as including bolster panels 14, in embodiments, the diaphragm suspension seating surface 4 may be formed without the bolster panels 14. Thus, in some embodiments, the bolster panels 14 are optional and not included.

Embodiments according to the present disclosure may provide a suspension arrangement that redefines the stretchable portion of the diaphragm as the seat is loaded by the occupant, optimizing the space allowed for deflection by the occupant and providing improved utility because greater support is possible for a particular elastomeric fabric without increasing its pre-tensioning stretch beyond normal ranges. In contrast to conventional devices, arrangements and methods, embodiments according to the present disclosure may have all reactive forces within the arrangement acting in directions that help support the occupant.

Usual to elastomeric fabrics used for seating diaphragms, the farther the fabric is stretched, the greater the fabric's supportive tension and the faster its resistance to stretch increases. This is true especially near the higher end of the material's working range. In transportation seating applications, the amount of space allowed for deflection of the comfort surface is limited. Therefore, it is advantageous to maximize the stretch per increment of distance that the occupant depresses the diaphragm. The present disclosure provides a seat having an elastomeric fabric diaphragm system that improves support by reducing the effective length of the elastomers as they come under tension from the occupant's weight. Junctions are formed in the diaphragm that includes a main portion and two flank portions arranged on opposite sides of the main portion. The flank portions are attached to a seat frame along their outboard perimeter edges. Tension-struts of flexible, non-stretch material are attached to the junctions and angle upward to connect the junctions to the seat frame at points higher than where the flank portions are attached. Although the tension-struts are inextensible, they are flexible and can bend as needed to conform under the occupant.

At rest and unoccupied, the diaphragm's effective stretch length is the full lateral width of the diaphragm, including the main portion and the two flank portions. When the occupant's weight deflects the diaphragm downward, the tension-struts control any further stretching of the diaphragm by constraining the stretch of the flank portions and concentrating the stretch in the main portion. The tension-struts include entirely non-stretch material (or more non-stretch material than stretch material) and, thus, prevent further stretching of the flank portions. This configuration limits the effective length of stretchable fabric to the width of the main portion. With the effective length of stretchable diaphragm limited to just the width of the main portion, any length of additional stretch of the main portion now represents a greater percentage of the length of available stretchable diaphragm and results in a faster buildup of supportive tension in the diaphragm than would occur if the effective or stretchable length were as long as the full width of the diaphragm.

The tension-struts are inextensible and resist elongation of the flank portions with forces in an upward and outward direction. Since the tension-struts do not elongate, when loading from the occupant forces the diaphragm downward, the reaction is a rotation of the tension-struts that draws the junctions downward and outward (e.g. FIG. 17). This increases the distance between the junctions causes additional stretch in the main portion and a pronounced rise in the tension of that diaphragm portion. As the stretch and tension in the diaphragm rises there is increased resistance to stretch and the diaphragm becomes more supportive.

In embodiments according to the present disclosure, cost is minimized or decreased by using existing low cost materials and manufacturing methods. Weight increase is limited by using thin wire for the tension-struts. Impact to comfort can be positive as the wire strut is flexible and angled upward offering more bolstering than a diaphragm alone. It is possible to include bolster panels (or upper flank portions) positioned above the tension-struts and attached between the junctions and the to the seat frame at a point higher than where the tension-struts are attached. These upper flank portions would provide increased bolstering and a comfort surface over the tension-struts. They would not be tensioned beyond the point where they deflect the diaphragm upward.

In some applications the diaphragm can be finished aesthetically and left exposed to become the upholstered seat. In some embodiments, it is advantageous to add cushioning or padding on top of the diaphragm to form a fully upholstered seat.

Advantageously, the elements of the seat bottom assembly may come in package or kit where one or more of the elements are partially assembled, or are fully unassembled. A user may install the partially assembled or unassembled seat bottom assembly to a structural frame of a seat by attaching the elements as disclosed herein in order to function as a seat bottom. A cushion or other padding may later be installed or arranged on top of the assembled seat bottom assembly.

Although various features have been shown in different figures for simplicity, it should be readily apparent to one of skill in the art that various features may be combined without departing from the scope of the present disclosure.

The foregoing description of embodiments of the present invention have been presented for the purpose of illustration and description. It is not intended to be exhaustive or to limit the invention to the form disclosed. Obvious modifications and variations are possible in light of the above disclosure. The embodiments described were chosen to best illustrate principles of the invention and practical applications thereof to enable one of ordinary skill in the art to utilize the invention in various embodiments and with various modifications as suited to the particular use contemplated.

What is claimed is:

1. A seat comprising:
a structural frame having a first side member and a second side member; and
a seat bottom assembly connected to the first side member and the second side member;
wherein the seat bottom assembly comprises a diaphragm having a first flank portion, a main portion and a second flank portion arranged between the first side member and the second side member, the main portion being located between the first flank portion and the second flank portion;
wherein the diaphragm is supported such that the main portion of the diaphragm contains an effective length of stretchable material of the diaphragm when supporting an occupant of the seat;
wherein the effective length of stretchable material of the diaphragm is limited to the main portion of the diaphragm; and
wherein the diaphragm includes elastomeric filaments and wherein the elastomeric filaments of the diaphragm are continuous and uninterrupted through the first flank portion, the main portion and the second flank portion.

2. The seat according to claim 1, wherein the seat bottom assembly comprises a first inextensible tension-strut and a second inextensible tension-strut, wherein the first inextensible strut supports the main portion of the diaphragm from the first side member, and wherein the second inextensible strut supports the main portion of the diaphragm from the second side member.

3. The seat according to claim 2, wherein the first inextensible tension-strut and the second inextensible tension-strut limit the effective length of stretchable material of the diaphragm to the main portion when supporting the occupant.

4. The seat according to claim 3, wherein the first inextensible strut and the second inextensible strut are configured to force lateral opposing edges of the main portion of the diaphragm away from each other and downward when supporting the occupant.

5. The seat according to claim 2, wherein the first inextensible tension-strut defines a plurality of waves.

6. The seat according to claim 2, wherein the first inextensible tension-strut has a first section comprising a first plurality of waves each having a first amplitude and a second section comprising a second plurality of waves each having a second amplitude, and wherein the first amplitude is larger than the second amplitude.

7. The seat according to claim 1, wherein the diaphragm is an elastomeric seating material.

8. The seat according to claim 7, wherein the elastomeric seating material is an open mesh fabric.

9. The seat according to claim 8, wherein the open mesh fabric has a leno weave pattern with elastomeric filaments in the warp and low-stretch polyester yarns in the weft.

10. The seat according to claim 1, further comprising a cushion arranged on top of the seat bottom assembly.

11. The seat according to claim 1, wherein the seat bottom assembly further comprises a first bolster panel and a second bolster panel, the first bolster panel and the second bolster panel being made of an elastomeric seating material, and wherein the first bolster panel is arranged above a first inextensible tension-strut and the second bolster panel is arranged above a second inextensible tension-strut.

12. A seat comprising:
a structural frame having a first side member and a second side member;
a diaphragm having a first flank portion, a main portion and a second flank portion, the main portion being located between the first flank portion and the second flank portion, and the diaphragm being connected to the first side member through a first attachment coil member and connected to the second side member through a second attachment coil member;
a first tension-strut supporting the diaphragm at a first junction between the first flank portion and the main portion; and
a second tension-strut supporting the diaphragm at a second junction between the second flank portion and the main portion.

13. The seat according to claim 12, wherein the first attachment coil member is arranged in perforations of a perforation attachment of the first side member to connect the diaphragm to the first side member; and wherein the second attachment coil member is arranged in perforations of a perforation attachment of the second side member to connect the diaphragm to the second side member.

14. The seat according to claim 12, wherein the first tension-strut connects to the first side member through a third attachment coil member, and wherein the second tension-strut connects to the second side member through a fourth coil attachment member.

15. The seat according to claim 12, wherein the first tension-strut and the second tension-strut are inextensible and flexible.

16. The seat according to claim 12, wherein the first tension-strut and the second tension-strut each have bend areas that straighten when supporting an occupant of the seat.

17. The seat according to claim 12, wherein the first tension-strut connects to the first junction through a first engagement wire arranged within a first junction coil member; and wherein the second tension-strut connects to the second junction through a second engagement wire arranged within a second junction coil member.

18. The seat according to claim 17, wherein the diaphragm includes elastomeric filaments and wherein the elastomeric filaments of the diaphragm are continuous and uninterrupted through the first flank portion, the main portion and the second flank portion.

19. A seat bottom assembly kit comprising:
a diaphragm;
a first attachment coil member configured to be threaded through the diaphragm;
a second attachment coil member configured to be threaded through the diaphragm;
a first inextensible tension-strut;
a second inextensible tension-strut;
a first junction coil member;

a second junction coil member;
a first engagement wire; and
a second engagement wire;
wherein the first junction coil member is configured to have the first engagement wire arranged therein, and the second junction coil member is configured to have the second engagement wire arranged therein;
wherein the first inextensible tension-strut is configured to connect to the first attachment coil member and to the first engagement wire when the first engagement wire is arranged within the first junction coil member; and
wherein the second inextensible tension-strut is configured to connect to the second attachment coil member and to the second engagement wire when the second engagement wire is arranged within the second junction coil member.

20. The seat bottom assembly according to claim 19, further comprising a first bolster panel and a second bolster panel, wherein the first junction coil member is configured to be threaded through the first bolster panel, and wherein the second junction coil member is configured to be threaded through the second bolster panel.

\* \* \* \* \*